Nov. 25, 1969  W. E. BUCK  3,480,353
REFLECTING PRISM CAMERA
Filed May 25, 1966  2 Sheets-Sheet 1
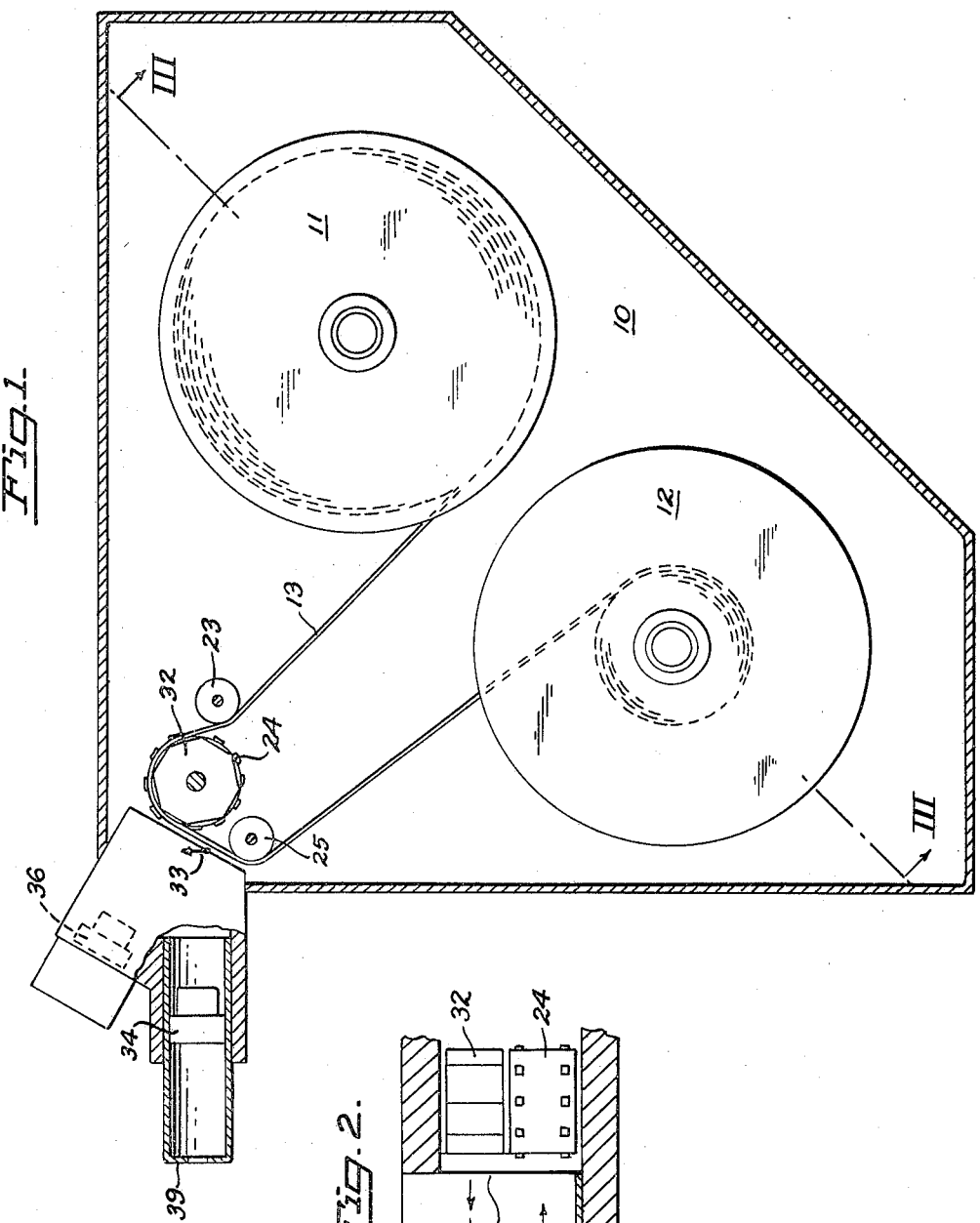
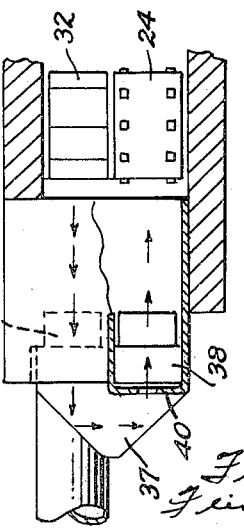
INVENTOR.
WILLARD E. BUCK
BY
Fryer Tjensvold
Flix + Phillips
ATTORNEYS

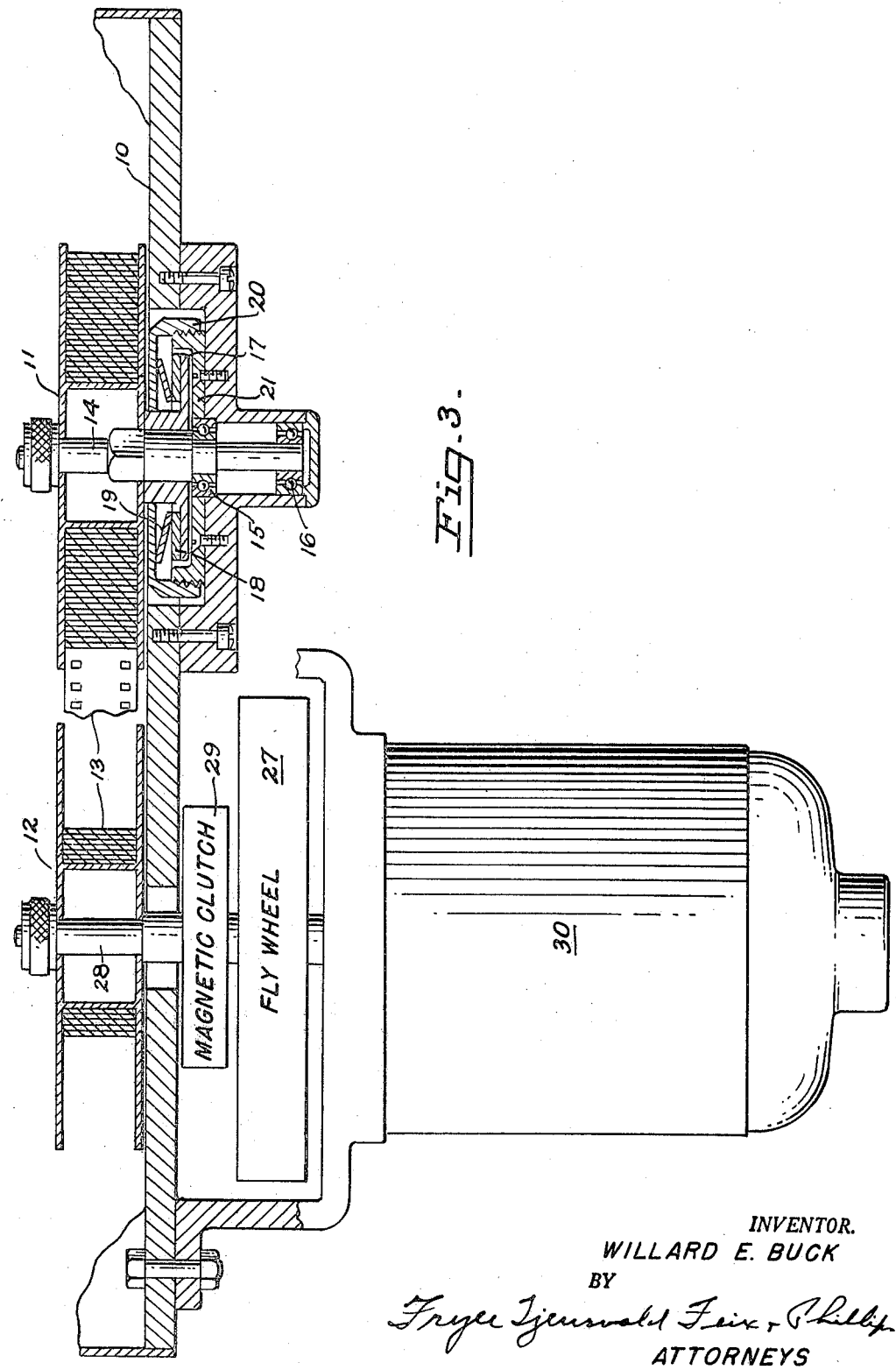

3,480,353
REFLECTING PRISM CAMERA
Willard E. Buck, Santa Clara, Calif., assignor, by mesne assignments, to Technical Operations, Incorporated, Burlington, Mass., a corporation of Delaware
Filed May 25, 1966, Ser. No. 552,880
Int. Cl. G03b 41/06, 41/00
U.S. Cl. 352—108                         6 Claims

ABSTRACT OF THE DISCLOSURE

A continuous film motion cine camera in which optical compensation is provided by a multi-faceted mirror mounted for rotation on a common shaft with a film-driven sprocket to provide inherent synchronization of image and film motion. The optical compensation components include a relay lens and a corner mirror reflector arrangement for reimaging a first image formed by an objective lens onto the moving film with the appropriate speed and orientation. A film take-up reel for transporting and storing the film strip is driven by a motor through a magnetic clutch and flywheel arrangement.

---

It is the object of the present invention to provide an improved reflecting prism camera of simple construction and low cost with a minimum of parts requiring close manufacturing tolerances.

A further object is to provide such a camera with excellent motion tracking capabilities wherein the speed of the image and the speed of the film are maintained equal without respect to film speed variations.

A still further object is to provide such a camera in which the film is moved by being wound upon a rotating reel but in which film speed increase due to enlargement of the effective diameter of the wheel during winding is minimized or eliminated.

Further and more specific objects and advantages of the invention and the manner in which it is carried into practice are made apparent in the following specification wherein it is described in detail by reference to the accompanying drawings.

In the drawings:

FIG. 1 is a view in side elevation of the camera of the present invention with one side wall thereof removed to expose internal mechanism;

FIG. 2 is a fragmentary plan view partially in section of the optical system shown in FIG. 1; and FIG. 3 is a fragmentary sectional view taken on the line III—III of FIG. 1.

In FIGS. 1 and 3, the camera of the present invention is shown as having an enclosed light-proof housing, one wall of which is illustrated at 10 as supporting a supply reel and a take-up reel 11 and 12, respectively, for carrying and moving film 13. The supply reel 11, as best shown in FIG. 3, is mounted on a shaft 14 journaled in bearings 15 and 16 which may be enclosed in a case exteriorly of the camera housing. Also contained within this case is a friction brake for maintaining tension on the film which comprises a brake disc 17 secured to the shaft 14 for rotation therewith and provided with a covering of brake lining material 18. A Belleville washer or other suitable spring 19 is adjustably compressed into contact with the brake shoe by a brake cover 20 threadedly secured to a stationary base 21.

The film 13 is threaded under a guide roller 23 shown in FIG. 1 thence over a film sprocket 24 (see also FIG. 2) around a second guide roller 25 and thence to the take-up reel 12 to the hub of which it is secured in any conventional manner. The take-up reel 12 is rotatable as by a flywheel 27 shown in FIG. 3 to which the shaft 28 of the take-up reel may be coupled as by a magnetic clutch schematically illustrated at 29. The details of construction of the magnetic clutch are not disclosed herein as there are many types of clutches and particularly electrically controlled clutches that will serve the purpose of the present invention.

To feed the film through the optical system of the camera, a motor 30 is energized to bring the flywheel 27 up to a predetermined speed and the clutch 29 is then engaged to rotate the take-up reel 12 withdrawing film from the storage reel and through the optical system of the camera. With conventional 16 millimeter motion picture film, film has been moved in this manner in excess of three hundred feet per second. The use of the flywheel 27 in place of power directly from the motor 30 eliminates the variation in speed during the time necessary to bring the motor 30 up to its full speed after energization thereof. The flywheel serves another important function because as its energy is spent during the short period required to exhaust the film from the supply reel, the effective diameter of the reel 12 is increased because of the winding of film thereon. Consequently the speed of film through the optical system tends to increase. This tendency, however, is minimized by the gradual reduction of the speed of the flywheel as the energy thereof is being spent.

The optical system of the camera is best shown in FIGS. 1 and 2 as comprising multifaced prism 32 with mirror surfaces thereon fixed to and rotatable with the film sprocket 24. The prism 32 may have any desired number of sides, eight being considered optimum, and rotates with the sprocket 24 freely in suitable bearings not shown.

The image of an object or event to be recorded enters the camera through an objective lens 34 to create a real image in space at approximately the position of the arrow 33 shown in FIG. 1 and directly in front of the rotating prism 32. This image is in effect swept by the prism through a relay lens 36 and thence by a right angular reflecting prism 37 through a relay lens 38, following the path of the arrows shown in FIG. 2, back toward the sprocket where it is focused upon and exposes the film trained thereover. The image thus displaced off the surface of the rotating mirror is positioned so that the image transmitted through the relay lenses 36 and 38 moves through space at the film plane at precisely the same speed as the moving film, providing motion compensation to prevent image blur during exposure.

A pair of framing stops at 39, before the objective lens, and at 40 between the relay lenses 36 and 38 act in a well known manner to shutter the light impinging the film and effect exposure in frames spaced in time and space on the surface of the film to obtain what is known as between the lens shuttering. Because of the fact that the prism and sprocket are on the same shaft, and the sprocket is driven by the moving film, the motion compensation relationship is precisely maintained for all film speeds, including transient accelerations which may occur. Extremely high resolution is maintained in this manner, eliminating alteration of the image motion compensation relationship commonly associated with backlash and pitch line diameter change in geared assemblies. Furthermore due to the fact that the prism 37 receives light from a direction normal to the axis of the prism 32 and reflects light in a direction normal to the film surface, better resolution is obtained than in many cameras where a rotating mirror is laterally offset and slightly inclined with respect to the surface of the film.

The camera of the present invention also has the advantage that the optical system is extremely compact and the parts in which precision effects the quality of the image are few and closely spaced.

I claim:
1. A cine camera comprising:
objective lens means on an optical axis for forming a first image of the photographed scene at a predetermined location within said camera;
film drive means for driving a strip of photosensitive film to be exposed continuously through an exposure location; and
optical compensation means comprising:
a rotatable multi-faceted mirror on said optical axis for forming a repetitive unidirectionally moving virtual image of said first scene image,
optical relay means including a lens and light reflective means for forming an image of said moving virtual scene image at said film exposure location, said first image of the scene being formed a distance in front of said multi-faceted mirror which is such that the motion of said virtual image produced by said multi-faceted mirror during rotation thereof, as magnified by said optical relay means, causes the velocity of said image at said exposure location to be matched to the velocity of said film moving through said exposure location,
rotatable sprocket means engaging said film strip so as to be driven thereby when said strip is being transported by said film drive means, and
means mechanically interconnecting said sprocket means and said multi-faceted mirror such that said film and image velocities are inherently synchronized.

2. The combination of claim 1 in which said film drive means comprises a film take-up reel, means to train film from a source of supply over the said sprocket means in driving engagement therewith, and means to drive the take-up reel.

3. A camera as defined by claim 1 wherein said reflective means comprises a pair of planar reflective surfaces defining a dihedral angle of substantially 90°.

4. A camera as defined by claim 3 wherein said rotatable mirror and said sprocket means are mounted for rotation on a common shaft.

5. A cine camera comprising:
objective lens means on an optical axis for forming a first image of the photographed scene at a predetermined location within said camera;
film drive means for driving a strip of photosensitive film to be exposed continuously through an exposure location;
optical compensation means comprising:
a rotatable multi-faceted mirror on said optical axis for forming a repetitive unidirectionally moving virtual image of said first scene image,
optical relay means including a lens and light reflective means for reimaging said moving virtual scene image at said film exposure location,
rotatable sprocket means engaging said film strip so as to be driven thereby when said strip is being transported by said film drive means, and
means mechanically interconnecting said sprocket means and said multi-faceted mirror such that said film and mirror movements are inherently synchronized;
said film drive means comprising a film take-up reel, means to train film from a source of supply over said sprocket means in driving engagement therewith to said film take-up reel, and means to drive said film take-up reel including motor means and clutch means for establishing a driving connection between said motor means and said take-up reel.

6. The combination of claim 5 including a flywheel between the motor and clutch means, whereby the flywheel may be rotated to a desired speed and thereafter coupled in driving relationship to the take-up reel.

References Cited

UNITED STATES PATENTS

| 3,259,448 | 7/1966 | Whitley et al. | 352—119 X |
| 1,564,295 | 12/1925 | Thorner | 352—108 |
| 1,903,204 | 3/1933 | Suhara | 352—108 |
| 1,944,022 | 1/1934 | Bundick et al. | 352—182 |
| 3,007,368 | 11/1961 | Rosenblum | 352—184 |

FOREIGN PATENTS

| 138,629 | 8/1934 | Austria. |
| 180,944 | 2/1907 | Germany. |
| 597,090 | 1/1948 | Great Britain. |

NORTON ANSHER, Primary Examiner

MONROE H. HAYES, Assistant Examiner

U.S. Cl. X.R.

352—84